United States Patent
Viikari et al.

(10) Patent No.: US 6,245,269 B1
(45) Date of Patent: Jun. 12, 2001

(54) PROCESS FOR PREPARING FIBER BOARDS

(75) Inventors: Liisa Viikari, Helsinki; Pia Qvintus-Leino; Marja-Leena Niku-Paavola, both of Espoo; Simo Tuominen, Huuvari; Lars Gädda, Porvoo, all of (FI)

(73) Assignee: Neste Chemicals Oy, Espoo (FI)

( * ) Notice: Subject to any disclaimer, the term of this patent is extended or adjusted under 35 U.S.C. 154(b) by 0 days.

(21) Appl. No.: 09/341,538

(22) PCT Filed: Jan. 14, 1998

(86) PCT No.: PCT/FI98/00022

§ 371 Date: Oct. 13, 1999

§ 102(e) Date: Oct. 13, 1999

(87) PCT Pub. No.: WO98/31875

PCT Pub. Date: Jul. 23, 1998

(30) Foreign Application Priority Data

Jan. 14, 1997 (FI) ............................................. 970156

(51) Int. Cl.[7] .................................................. B29C 67/00
(52) U.S. Cl. ............................................. 264/109; 210/632
(58) Field of Search ............................. 264/109; 210/632

(56) References Cited

U.S. PATENT DOCUMENTS

| | | |
|---|---|---|
| 4,432,921 | 2/1984 | Haars et al. . |
| 4,765,901 | 8/1988 | Field . |

FOREIGN PATENT DOCUMENTS

| | | |
|---|---|---|
| 3037992A1 | 8/1982 | (DE) . |
| 3621218A1 | 1/1988 | (DE) . |
| 3933279C1 | 7/1990 | (DE) . |
| 4020969C1 | 7/1991 | (DE) . |
| 4204793C1 | 4/1993 | (DE) . |
| 4306439C1 | 8/1994 | (DE) . |
| 565109A1 | 10/1993 | (EP) . |
| WO9325622 | 12/1993 | (WO) . |
| WO9401488 | 1/1994 | (WO) . |
| WO95/07604 | 3/1995 | (WO) . |
| WO9523232 | 8/1995 | (WO) . |
| WO9603546 | 2/1996 | (WO) . |

OTHER PUBLICATIONS

Abstract of EPO 565,109 (Oct. 13, 1993).

*Primary Examiner*—Leo B. Tentoni
(74) *Attorney, Agent, or Firm*—Birch, Stewart, Kolasch & Birch, LLP

(57) ABSTRACT

A process for manufacturing fiber boards and similar wood-based products from a lignocellulosic raw material having a moisture content of at least 10 wt-%. According to the process, an aqueous fraction is separated from the fibers of the raw material, which fraction later is recycled to the process in order to form at least a part of the agent used for binding the fibers. Before mixing with the fibers, the aqueous effluent is concentrated and enzymatically oxidized in the presence of oxygen in order to polymerize the solubilized wood material and in order to increase its concentration. Lignin can be added to the water solubilized wood material or the solubilized wood material can be added to the fibers together with another binder. Eventually, the mixture is formed into a board and hardened.

11 Claims, 1 Drawing Sheet

PROCESS FOR PREPARING FIBER BOARDS

This application is the national phase under 35 U.S.C. §371 of PCT International Application No. PCT/FI98/00022 which has an International filing date of Jan. 14, 1998 which designated the United States Of America.

FIELD OF THE INVENTION

The present invention relates to the manufacture of fiber boards and similar wood-based products comprising finely divided lignocellulosic particles and fibers mixed with and bonded together with an adhesive binder. In particular the present invention concerns a novel process for the production of fiber boards.

BACKGROUND OF THE INVENTION

The rapid increase in the production of particle boards, flake boards and fiber boards, especially medium density fiber boards (in the following also abbreviated MDF boards), during the last decades has created a demand for adhesives that are inexpensive, available in large quantities, and independent of crude oil. Lignin meets well these requirements, and it does not contain any formaldehyde, which traditionally has been considered a serious problem with conventional urea-formaldehyde (UF) adhesives. As a major wood component, native lignin is neither hygroscopic nor soluble in water. Because of its structure as a polyphenol, lignin as an adhesive should be similar to phenol-formaldehyde (PF) resins. This is true for native lignin in wood, while technical lignins (lignosulphonate or kraft lignin) have been shown to have serious limitations due to their low reactivity (kraft lignin) or due to their high hygroscopicity. Furthermore, during technical pulping lignin becomes soluble in water, due to degradation and chemical changes.

The use of spent sulphite liquor (SSL) as an adhesive for paper, wood and other ligno-cellulosic materials is well-known in the art, and a large number of patent applications has been filed during the last three decades for the use of lignin products as adhesives for particle board, plywood and fiber board instead of conventional PF or UF adhesives. Reference is made to DE Patents Nos. 3 037 992, 3 621 218, 3 933 279, 4 020 969, 4 204 793 and 4 306 439 and PCT Applications published under Nos. WO 93/25622, WO 94/01488, WO 95/23232 and WO 96/03546.

The main drawback of using SSL as an adhesive for fiber board manufacture is its hygroscopicity.

It has been shown that laccase enzymes and other peroxidases can be used as polymerization or curing catalysts of lignin (DE Patent No. 3 037 992, WO 96/03546). However, the enzymes for creating radical reactions have shown limited success so far. Fibers and wood chips used in the production of the fiber board contain 5–20% water and the laccases used need some water to effectively catalyze the polymerization reaction needed for extensive bonding of the fiberboard. Kraft lignin like native lignin to its major part is, however, insoluble in water and thus two solid phases are formed on the production line. An uneven distribution of the solids cause spotting and major failure in the strength properties of the board formed in the pressing stage.

A further problem relating to the use of isolated lignin is the high price of kraft lignin, which is near the limit for economical production of particle boards.

For the above mentioned reasons, lignin-based board production processes have not, so far, led to any major practical applications.

Instead of lignin-based adhesives, it has been suggested to activate the lignin of wood fibers with laccase and to use these fibers as such without any additional binders for manufacturing wood fiber boards (cf. EP Patent Application No. 0 565 109). The main problem relating to said technology is the long incubation time required (up to seven days or even more).

Components derived from annual plant materials, such as feruloylarabinoxylans, can also be used as additives for adhesives in particle boards. Thus, according to Feldman et al. (WO 96/03546) wood fibers and chips can be bonded together using an oxidized phenolic polysaccharide. These xylans occur only in annual plants, not in softwood or hardwood materials. They are not industrially available.

SUMMARY OF THE INVENTION

The present invention aims at eliminating the problems relating to the prior art. In particular it is an object of the present invention to provide a novel process for manufacturing fiber boards.

These and other objects, together with the advantages thereof over known lignin-based adhesives, which shall become apparent from the specification which follows, are accomplished by the invention as hereinafter described and claimed.

It is known in the art that during the preparation of MDF fibers, there is formed a water-soluble fraction during refining which contains components of wood. This fraction is separated from the fibers before the fibers are dried. The fraction contains about 1 to 2 wt-% of the original dry substance of the fibers. In conventional processes this fraction adds to the BOD and COD loading of the effluents and it increases the need for biological purification.

The present invention is based on the idea of recirculating said fraction to the process, wherein it forms at least a part of the adhesive binder used for binding of the fibers. In order to improve the adhesive properties of the fraction its components are polymerized with an oxidative enzyme.

The gluing results of the novel process are comparable to those obtained with commercially available glues (synthetic resins).

In short, according to the present invention, it has been found out that the adhesive, usually externally produced, such as phenolformaldehyde or ureaformaldehyde, can be replaced by natural, wood-derived fractions, separated from refining of the wood raw material of the process. The process for manufacturing fiber boards comprises the steps of refining lignocellulosic raw material having a moisture content of at least 10 wt-% to provide a defibered pulp containing lignocellulosic fibers and an aqueous effluent containing solubilized wood material, separating the refined lignocellulosic fibers from the aqueous effluent, concentrating the aqueous effluent to increase the concentration of the solubilized wood material thereof, treating the solubilized wood material with enzymes in the presence of oxygen in order to oxidize the solubilized wood material, mixing the oxidized wood material with the fibers, forming the fiber mixture into a board, and hardening the boards to form a fiber board.

The additional benefit of this method is that the volumes of waste waters requiring external purification are diminished. Furthermore, MDF boards with excellent strength properties can be obtained.

The invention will now be explained in more detail with the aid of the following detailed description and with reference to the attached drawing and further referring to a number of working examples.

BRIEF DESCRIPTION OF THE DRAWING

The attached drawing

DETAILED DESCRIPTION OF THE INVENTION

Figure 1:
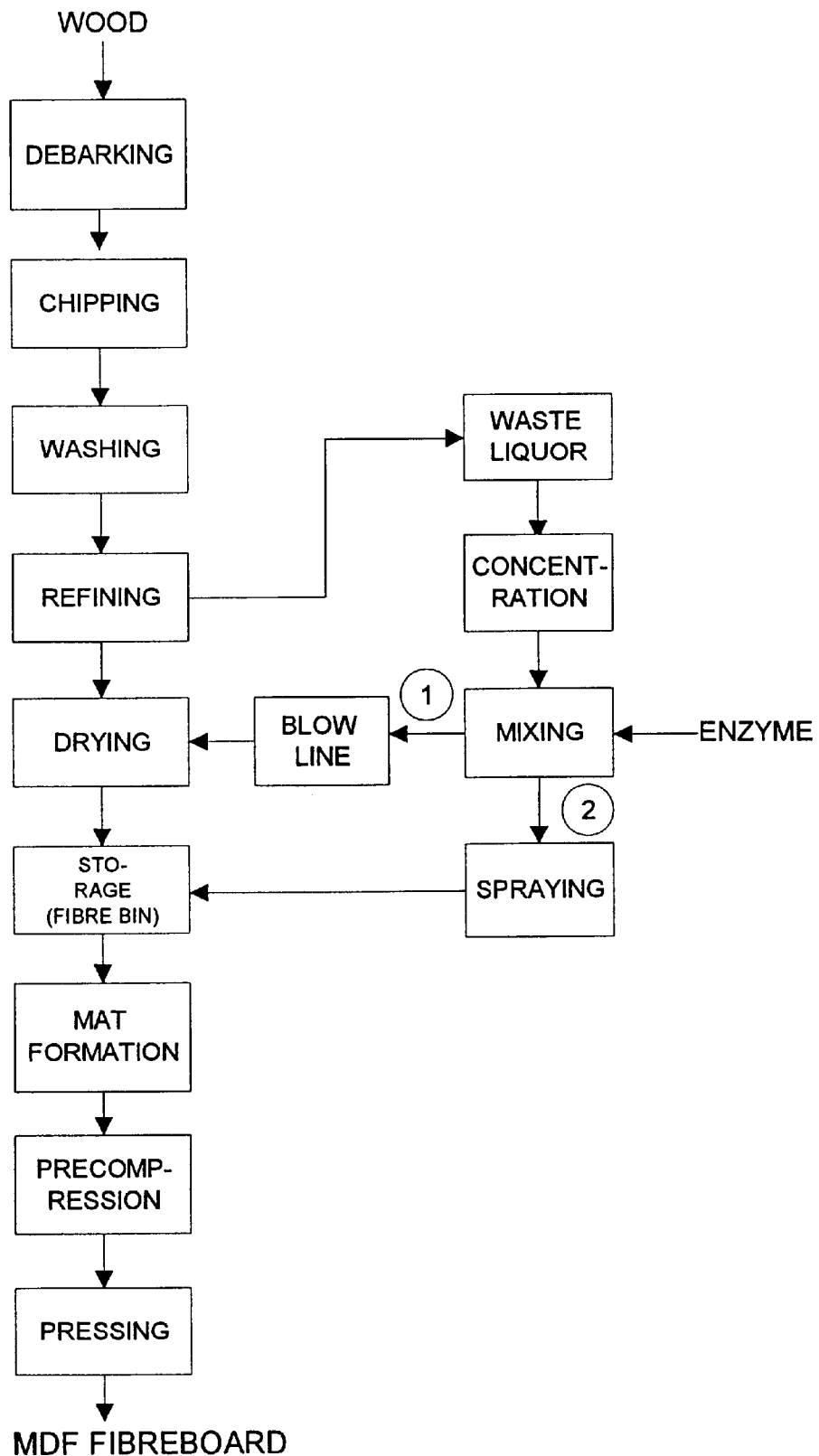
FIG. 1 depicts, in the form of a flow sheet, a simplified process configuration for a preferred process embodiment according to the present invention.

Within the context of the present invention the terms "adhesive", "adhesive binder" and "resin" designate a chemical composition which, in the wet stages of the manufacture of, e.g. particle and fiber boards, provides adhesion between the particles, fibers or flakes. After heat compression during board manufacture, the composition containing polymerized resin works as a binder which keeps the particles or fibers or flakes bonded together.

The term "wood-based product" denotes any lignocellulose-based products, such as particle boards, fiber boards (including high and medium density fiber boards, i.e. hard boards and MDF boards), flake boards, plywood and similar products constituted by particles, fibers or flakes of vegetable origin, in particular derived from wood or annular or perennial plants mixed with and bonded together with adhesive binders.

For polymerizing lignin and carbohydrates of soluble wood fractions, oxidative enzymes capable of catalyzing oxidation of phenolic groups can be used. These enzymes are oxidoreductases, such as peroxidases and oxidases. "Peroxidases" are enzymes which catalyze oxidative reaction using hydrogen peroxide as their substrate, whereas "oxidases" are enzymes which catalyze oxidative reactions using molecular oxygen as their substrate. Phenoloxidases (EC 1.10.3.2 benzenediol:oxygen oxidoreductase) catalyze the oxidation of o- and p-substituted phenolic hydroxyl and amino/amine groups in monomeric and polymeric aromatic compounds. The oxidative reaction leads to the formation of phenoxy radicals and finally to the polymerization of lignin and possibly the carbohydrate matter. In the method of the present invention, the enzyme used may be any of the enzymes catalyzing the biological radical formation and secondary chemical polymerization of low molecular weight lignins, such as laccase, tyrosinase, peroxidase or oxidase.

As specific examples of oxidases the following can be mentioned: laccases (EC 1 10.3.2), catechol oxidases (EC 1.10.3.1), tyrosinases (EC 1.14.18. 1) and bilirubin oxidases (EC 1.3.3.5). Laccases are particularly preferred oxidases. They can be obtained from bacteria and fungi belonging to, e.g., the following strains: Aspergillus, Neurospora, Podospora, Botrylis, Lentinus, Polyporus, Rhizoctonia, Coprinus, Coriolus, Phlebia, Pleurotus, Fusarium and Trametes.

Suitable peroxidases can be obtained from plants or fungi or bacteria. Preferred peroxidases are those which originate from plants, in particular horseradish peroxidase and soy bean peroxidase.

The terms "surfactant" or "surface active agent" are synonymously used to designate compounds which have affinity to water and to hydrophobic (e.g. fatty) materials, thus helping the hydrophobic materials to suspend in water.

Medium Density Fiberboards (abbreviated MDF) are used for construction and in furniture manufacturing. It is produced as panels having thicknesses in the range of 2.5 to 40 mm or even more. In comparison to particle boards, MDF processes give panels having higher strength and a more homogeneous structure than particle boards.

Referring to the attached drawing, a preferred process embodiment according to the present invention for producing MDF boards comprises the following steps, most of which are common with conventional processes:

The raw material, wood logs or a similar wood-based raw material, is first debarked and chipped to produce a substantially uniform feedstock of chips which can be screened and washed to remove dirt and contaminants. According to the present invention, various wood species can be used for MDF production, although softwood is the most common raw material. Today, roughly half of the plants operate on softwood as raw material, 20% are running on hardwood and 20% use a mixture of hard- and softwood. Less than 10% of the plants are operating on other materials, such as bagasse and cotton stalks.

The chips from the washer are then fed to a refiner which is similar to those used in TMP processes. However, the refining conditions are quite different from those used to make fibers for paper making, with a much higher intensity thermal treatment followed by refining at low energy levels. Typically the chips are presteamed at an atmospheric pressure for 6 to 20, preferably 8 to 10 minutes and then preheated for 1–10 minutes at a pressure of more than 5 bar, preferably 6 to 15, in particular about 8 bar. The refining energy consumption is about 200 to 250 kWh/t in comparison to the 10-fold energy consumption of refining chips for paper fiber grades.

In the refiner a small amount of wax (generally less than 1 wt-%) can be mixed with the fibers.

Conventionally, the fibers are mixed with an adhesive in a high velocity blowline where steam from the refiner carries the fibers and mixes the adhesive which is pumped into the blowline. The fibers are then dried and conveyed to storage bins. The dryer is usually a long tube which discharges into a cyclone which separates the fiber matter from the conveying gases. After storage, a continuous mat having the width of the pressline is formed in the mat former at the beginning of a pressline. The fiber is distributed across the width of the former typically using air jets or mechanical displacement to lay the fiber as a uniform mat at a weight which will give the desired density of the panel after pressing. After the mat forming, the density is low with a mat thickness of 20 to 25 times final thickness of the panel. A precompressor compresses the mat down to 8 to 10 times the desired panel thickness.

The final pressing takes place using heat so as to cure the adhesive binder to form bonds which give the panel its integrity. Generally a series of batch presses are used having plates arranged vertically to allow the application of the force needed to compress the mats. After pressing, the panels are cooled and stacked before panel finishing operation. Sanding is used to give a smooth surface finish.

The process according to the present invention differs from conventional fiber board manufacture in the sense that at least a part of the adhesive binder of the fibers is replaced with a fraction of the wood or lignocellulosic raw material obtained from refining and which is soluble in water. During the refining process described above, some of the wood raw material is dissolved because of, for example, the high temperature. The yields of fibres after the refining process vary depending on the wood species and process conditions used, but yields of 96–98% are common. This means that in these cases from 2 to 4% of the wood is solubilized in the water stream. This water is essentially composed of the natural water in the wood, making up to at least 10%, usually 30 to 70%, usually about 50% of the original moist wood. In the previous case this means that a waste stream with a dry weight content of 1 to 2% can be formed.

Said dry matter fraction is composed of the basic components of wood; cellulose, hemicellulose and lignin, the amounts depending on the wood species and the refining conditions used. Roughly, the process water of softwood chips contains some 40 to 70% carbohydrates, 10 to 30% reducing compounds, 10 to 25% lignin and 1 to 10% extractives. In contrast, hardwood pulping process water contains some 20 to 60% carbohydrates, 20 to 40% reducing compounds, 10 to 25 % lignin and 10 to 40% extractives. The percentages are given by way of examples only and they have been calculated from the dry weight of the solid matter.

This fraction is separated from the fibres during the processing; i.e. fibres are collected to be glued with a suitable adhesive, and the solubilized fraction is separated from the fibres. In conventional processes, the formation of a soluble fraction results in an undesired environmental loading. Said fraction forms the major waste water stream to be purified by external waste water treatment plants.

In connection with the present invention it has turned out that the various components of the soluble fraction are all reactive towards oxidation in the presence of oxidase enzymes. As evidenced by the results of Table 3, MDF process water as well as some other fractions consume considerable amounts of oxygen as a result of enzymatic oxidation using laccase. Not wishing to be confined to any specific theory, it is nevertheless suggested here that there are formed various oxidized compounds containing, e.g., phenoxy radicals, which will provide adhesion to the lignocellulosic particles and fibers and which will take part in polymerization reactions.

The MDF panel is produced by processing the wood fiber and mixing it with up to about 20, preferably about 1 to 10 wt-% (calculated on basis of the weight of the fibers) of a suitable glue or adhesive binder. Without the addition of an adhesive binder, it is not possible to produce the pressed panel.

According to the present invention, the separated soluble fraction is formulated into an adhesive binder by mixing it with an oxidase to provide oxidation and polymerization of the carbohydrates, lignin and extractives present. As shown in the attached Figure, for this purpose, the soluble fractions are separated from the fibers and the aqueous phase is concentrated by filtration, ultrafiltration or evaporation or other suitable separation techniques. The dry matter content of the soluble fraction is usually less than 10 wt-%, often less than 5 wt-%. Consequently, it has to be concentrated to a much higher concentration before use. Typically, the dry matter content of the adhesive composition treated with enzymes, is about 20 to 80 wt-%. The soluble fraction used for the preparation of an adhesive binder comprises preferably about 10 to 70% carbohydrates and about 1–30% lignin calculated on basis of the dry weight of the water soluble fraction.

The enzyme used can be any of the enzymes prior known for catalyzing the oxidation and polymerization of aromatic compounds or lignins, such as laccase, tyrosinase, or other oxidases. The amount of enzyme used varies depending on the activity of the enzyme and on the amount of dry matter content of the composition. Generally, the oxidases are used in amounts of 0,001 to 10 mg protein/g of dry matter, preferably about 0,1 to 5 mg protein/g of dry matter. The activity of the oxidase is about 1 to 100,000 nkat/mg, preferably over 100 nkat/mg.

In connection with the present invention it has been found that oxygen plays a decisive role in the enzymatic polymerization of carbohydrates, extractives and lignin of any origin. This is important in particular for the production of adhesives for the manufacture of fiber boards, particle boards and flake boards and other similar wood-based products. Thus, in addition to the carbohydrate or lignin material, also oxygen is needed in sufficient amounts. The oxidative reaction leads to the formation of oxidized radicals (e.g. phenoxy radicals) and finally to the polymerization of the material.

In the known methods discussed in above, crosslinking was only partially achieved because of apparent limitations on the availability of oxygen. The limitation of the reaction by oxygen manifests itself in the long reaction times used, and in the poor strength properties obtained, thus impairing the result of the enzyme-aided polymerization.

Oxygen supply can be improved by various means, such as efficient mixing, foaming, or introducing air enriched with oxygen or oxygen supplied by enzymatic or chemical means to the solution. Although any oxygen-containing gas can be used, it is preferred to use air, oxygen enriched air, oxygen gas or pressurized systems of these.

Thus, according to an embodiment of the invention, the mixture comprising the soluble fraction is vigorously mixed in the presence of oxygen by e.g. aerating the mixture. The mixing time is usually about 1 min to 24 h, preferably about 5 min to 10 h.

According to an alternative embodiment, the supply of oxygen is achieved by producing a foam of the adhesive binder by mixing the soluble fraction of lignin into water together to form a mixture and by bubbling a gas through the suspension to form bubbles having a medium diameter of 0.001 to 1 mm, in particular about 0.01 to 0.1 mm. By foaming, the volume of the dispersion can be increased to 1.1 to 10 times the original volume.

The foam is produced by using a surface active agent that can be anionic, cationic or non-ionic. Thus, the surfactant can be selected from the group consisting of alkylsulfonate or alkyl benzene sulfonate, Tween® and other commercial polysorbate compounds, fatty acid soaps, lignosulfonates, sarcosinates, fatty acid amines or amines or poly(oxyetylene alcohol)s and wood and plant extractives. Foam stabilizers and solid surfactants, such as CMC, gelatin, pectin, wood extractive and similar compounds, can be used to produce and enhance the foam stability. A small amount of the surface active agent is needed, i.e. about 0.01 to 10%, in particular about 0.05 to 5%.

The foam can be produced by foaming in a static foamer or in a turbulent foam cell by using known mixing technology.

The binder obtained from the soluble fraction can be mixed with the fibers in the blow line, i.e. essentially before drying of the fibers. This is depicted as alternative 1 in the attached drawing. Alternatively, the binder can be sprayed upon the dried chips stored in the storage bins (cf. alternative 2). In both cases, it is also possible to oxidate the binder simultaneously with the mixing of the fibers or chips with the components of the binder composition. The composition is added to the fibers in an amount of 0.1 to 30%, preferably about 1 to 10% of the total dry weight.

As mentioned above, the soluble fraction can replace a part or all of the conventional binder used for preparing the fiber boards. Thus, according to a particularly preferred embodiment, lignin is admixed with the binder composition before the enzymatic oxidation. The amount of lignin can vary from 1 to 99% of the dry matter of the composition, preferably the composition contains 5 to 95 % lignin and 95 to 5% soluble fraction (which already in itself contains some lignin). A part of the lignin can be added in the form of lignin-containing fibers. Of course, it is also possible to replace a part of conventional UF or PF resins with the soluble fraction.

The following non-limiting working examples illustrate the method and its advantages in more detail.

Example 1

Separation of the Soluble Fraction

The soluble fraction was isolated from the softwood or hardwood fibres after the refining process, and concentrated by evaporation to various dry weight concentrations, according to the needs.

Example 2

Composition of the Soluble MDF Fraction

The composition of the solubilized fraction from hardwood was analyzed for lignin, extractives and carbohydrates. The results are presented in Table 1.

TABLE 1

Composition of MDF process water from hardwood

| Composition | % of DW |
|---|---|
| Lignin | |
| acid insoluble | 21.4 |
| acid soluble | 1.9 |
| Extractives | 22 |
| Identified sugars | |
| Rhamnose | 0.8 |
| Arabinose | 1.8 |
| Galactose | 2.7 |
| Glucose | 20.6 |
| Xylose | 8.7 |
| Mannose | 2.2 |
| Sugar acids | 2.7 |
| Total | 39.5 |

In another case, the solubilized fraction was isolated from softwood. The composition is presented in Table 2.

TABLE 2

Composition of solubilized components from softwood.

| Composition | % of DW |
|---|---|
| Lignin | 18 |
| Extractives | 22 |
| Carbohydrates | 57 |
| Reducing compounds | 24 |
| Identified sugars | |
| Arabinose | 1.3 |
| Galactose | 1.7 |
| Glucose | 7.2 |
| Xylose | 0.7 |
| Mannose | 10.8 |
| Sugar acids | 0.5 |

Example 3

Reactivity of the Soluble Fraction Towards Enzymatic Polymerization

The reactivity of the solubilized fraction towards the enzymatic polymerization was analyzed by the specific oxygen consumption of the material. The reactivity was compared with the corresponding values of kraft lignin and lignosulphonate. As can be seen from Table 3, the reactivity is fairly high.

TABLE 3

Reactivity of the solubilized fraction, kraft lignin and lignosulphonate.

| Solubilized fraction/substrate | oxygen consumption mg/g substrate |
|---|---|
| MDF water, soluble part | 0.9 |
| kraft lignin | 2.5 |
| lignosulphonate | 4.3 |

Example 4

Glueing of MDF Fibres With the Soluble Fraction in the Enzyme Catalyzed Glueing Reaction Soluble fractions produced as described in Examples 1 and 2 were used as binders in particle board and MDF test panel glueing. 4.0 g of the lignin fraction was vigorously mixed and aerated for 30 min with 4.0 g of laccase concentrate (activity 4000 nkat/lg) in 2.0 g of 2 M sodium acetate buffer (pH 4,5). In case of particle board panels, 1.4 g of the mixture was either sprayed onto or mechanically mixed with 4.4 g of particle board chips and in case of MDF panels 5.5 g of the mixture was sprayed onto or mechanically mixed with 20 g of dry fibers. The fibers or chips had already been treated with 0.7% of wax (Mobilex 54, 60% emulsion in water) of the dry weight of the fibers. The reference tests were performed without laccase (water was used instead) and using commercial ureaformaldehyde resins. The soluble fraction was concentrated with industrial lignins.

For strength tests particle board panels of the size of 50 mm×50 mm×2 mm (weight about 5 g) were prepared by pressing 2 min in 30 kp/cm2 of pressure and 190° C. of temperature and MDF panels of the size of 90 mm×90 mm×2 mm (weight about 22 g) were prepared by pressing 2 min in 50 kp/cm2 of pressure and 190° C. of temperature. After pressing, the panels were then cut into four pieces (50 mm×12 mm×2 mm). These pieces were tested for parallel tensile strength with Zwick tensile strength testing equipment.

TABLE 4

Results of the small scale glueing tests for MDF fibers

| Adhesive binder | Tensile strength MPa |
|---|---|
| Water | 15 ± 2 |
| Soluble fraction | 24 ± 2 |
| Soluble fraction + laccase | 30 ± 2 |
| Soluble fraction (10%) + Indulin | 45 ± 2 |
| AT (90%) + laccase | 38.9 ± 2 |
| Reference UF resin | |

Example 5

Glueing of Particle Boards With the Soluble Fraction and the Soluble Fraction in Addition to Lignin Particle board chips were glued according to the procedure presented in example 5. The strength values of the glued test panels are shown in Table 5.

TABLE 5

Results of the small scale glueing tests for particle board chips

| Bioglue | Tensile strength MPa |
| --- | --- |
| Soluble fraction | 3.8 ± 0.6 |
| Soluble fraction + laccase | 6.2 ± 0.4 |
| Soluble fraction (10%) + Indulin AT (90 %) + laccase | 13.8 ± 0.4 |
| Indulin AT + laccase | 12.7 ± 0.7 |
| Water | 3.0 ± 0.5 |
| Reference UF resin | 12.5 ± 0.7 |

What is claimed is:

1. A process for manufacturing fiber boards and wood-based products, which comprises the steps of refining lignocellulosic raw material having a moisture content of at least 10 wt-% to provide a defibered pulp containing lignocellulosic fibers and an aqueous effluent containing solubilized wood material, separating the refined lignocellulosic fibers from the aqueous effluent, concentrating the aqueous effluent in order to increase the concentration of the solubilized wood material, treating the solubilized wood material with enzymes in the presence of oxygen in order to oxidize the solubilized wood material, mixing the oxidized wood material with the fibers, forming the fiber mixture into a board, and hardening the boards to form a fiber board.

2. The process according to claim 1, wherein the aqueous effluent contains 10 to 70% carbohydrates and 1–30% lignin calculated on basis of the dry weight of the water soluble fraction.

3. The process according to claim 1 or 2, wherein the solubilized wood material is mixed with 5 to 95 wt-% lignin before mixing with the fibers.

4. The process according to claim 3, wherein the solubilized wood material is mixed with lignin isolated from chemical pulping of lignocellulosic raw materials.

5. The process according to claim 1, wherein the solubilized wood material is oxidized and polymerized by an oxidase.

6. The process according to claim 1, wherein the dry matter of said effluent is concentrated to a dry weight concentration of 20–60%.

7. The process according to claim 1, wherein the solubilized wood material is oxidized in the presence of air, oxygen enriched air, oxygen gas or mixtures thereof.

8. The process according to claim 7, wherein the oxygen-containing gas is introduced by foaming the suspension.

9. The process according to claim 1, wherein the oxidized wood material is added before drying of the fibers.

10. The process according to claim 1, wherein the oxidized wood material is added after drying of the fibers.

11. The process according to claim 1, wherein the oxidized wood material together with any other adhesive binder is added to the fibers in an amount of 1 to 10% of the total dry weight of the fibers.

* * * * *